United States Patent
Li et al.

(10) Patent No.: US 11,921,976 B2
(45) Date of Patent: Mar. 5, 2024

(54) DISPLAY METHOD, DISPLAYING DEVICE, ELECTRONIC APPARATUS, AND STORAGE MEDIUM

(71) Applicant: BOE Technology Group Co., Ltd., Beijing (CN)

(72) Inventors: Yanfu Li, Beijing (CN); Lihua Geng, Beijing (CN); Qingguo Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 344 days.

(21) Appl. No.: 17/417,576

(22) PCT Filed: Oct. 23, 2020

(86) PCT No.: PCT/CN2020/123291
§ 371 (c)(1),
(2) Date: Jun. 23, 2021

(87) PCT Pub. No.: WO2021/083050
PCT Pub. Date: May 6, 2021

(65) Prior Publication Data
US 2022/0057903 A1    Feb. 24, 2022

(30) Foreign Application Priority Data
Oct. 31, 2019    (CN) .......................... 201911053530.1

(51) Int. Cl.
*G06F 3/0482*    (2013.01)
*G06F 9/451*    (2018.01)
*H04N 5/265*    (2006.01)

(52) U.S. Cl.
CPC ............ *G06F 3/0482* (2013.01); *G06F 9/451* (2018.02); *H04N 5/265* (2013.01)

(58) Field of Classification Search
None
See application file for complete search history.

(56) References Cited

U.S. PATENT DOCUMENTS

2002/0180812 A1* 12/2002 Kim .................. G09G 5/14
                                                                 715/856
2004/0155982 A1    8/2004 Jeong
(Continued)

FOREIGN PATENT DOCUMENTS

| CN | 1905646 A | 1/2007 |
|---|---|---|
| CN | 101697114 A | 4/2010 |

(Continued)

OTHER PUBLICATIONS

Office Action dated Dec. 3, 2021, issued in CN application No. 201911053530.1 with English Machine Translation. (12 pages).

*Primary Examiner* — Peter Hoang
(74) *Attorney, Agent, or Firm* — WHDA, LLP

(57) ABSTRACT

A display method, a displaying device, electronic equipment and a storage medium. The display method comprises: acquiring menu data, target display position data of the menu data on a display screen, and source data, wherein the source data includes N channels of first display data, and the first display data has a preset size; conducting format conversion on the menu data to obtain M channels of second display data with a preset size; fusing the first display data with the second display data according to the target display position to obtain third display data; and displaying the third display data on the display screen.

12 Claims, 6 Drawing Sheets

(56) References Cited

U.S. PATENT DOCUMENTS

| | | |
|---|---|---|
| 2005/0134525 A1 | 6/2005 | Tanghe et al. |
| 2005/0156818 A1 | 7/2005 | Tsuji |
| 2007/0019111 A1 | 1/2007 | Won |
| 2011/0221757 A1 | 9/2011 | Hsieh |
| 2014/0055675 A1 | 2/2014 | An et al. |
| 2018/0013978 A1 | 1/2018 | Duan et al. |

FOREIGN PATENT DOCUMENTS

| | | |
|---|---|---|
| CN | 101984397 A | 3/2011 |
| CN | 102004541 A | 4/2011 |
| CN | 103021376 A | 4/2013 |
| CN | 103634633 A | 3/2014 |
| CN | 104469212 A | 3/2015 |
| CN | 105094289 A | 11/2015 |
| CN | 105141876 A | 12/2015 |
| CN | 105187747 A | 12/2015 |
| CN | 205050541 U | 2/2016 |
| CN | 106775270 A | 5/2017 |

\* cited by examiner

DISPLAY METHOD, DISPLAYING DEVICE, ELECTRONIC APPARATUS, AND STORAGE MEDIUM

CROSS REFERENCE TO RELEVANT APPLICATION

This application claims priority over Chinese Patent Application No. 201911053530.1 filed on Oct. 31, 2019, the entire contents of which are hereby incorporated by reference.

TECHNICAL FIELD

The embodiments of the disclosure relate to the technical field of display, in particular to a display method, a displaying device, electronic equipment and a storage medium.

BACKGROUND

In recent years, the market demand for large-size display screens has risen steadily. When using large-size displays, it is often necessary to call an OSD (on-screen display) to select display channels and configure various display parameters. Large-size display screens usually display an OSD in a specific area, such as the upper left corner of the screen. If a display screen is too large, it is difficult for users to select channels or set display parameters.

SUMMARY

The embodiments of the disclosure provide a display method, a displaying device, electronic equipment, and a storage medium.

A display method, comprising:
acquiring menu data, target display position data of the menu data on a display screen, and source data, wherein the source data includes N channels of first display data, the first display data has a preset size, and N is an integer greater than 2;
conducting format conversion on the menu data to obtain M channels of second display data with a preset size, wherein M is an integer greater than or equal to 1 and less than or equal to N;
fusing the first display data with the second display data according to the target display position data to obtain third display data; and
displaying the third display data on the display screen.
wherein conducting format conversion on the menu data comprises:
storing the menu data in a storage unit according to the target display position data; and
reading the menu data from the storage unit according to the preset size to obtain the second display data.
wherein storing the menu data in the storage unit according to the target display position comprises:
when it is determined that the target display position data is located in an upper area of the display screen, storing the menu data from a first address of the storage unit, wherein the first address is an initial address of the storage unit; and
when it is determined that the target display position data is located in a lower area of the display screen, storing the menu data from a second address of the storage unit, wherein the second address is determined according to an initial size and preset size of the menu data.
wherein fusing the first display data with the second display data according to the target display position comprises:
when it is determined that the target display position data is located in a left area of the display screen, fusing the M channels of second display data with the first M channels of first display data among the N channels of first display data, wherein the first M channels of first display data is located in the left area of the display screen; and
when it is determined that the target display position data is located in a right area of the display screen, fusing the M channels of second display data with the second M channels of first display data among the N channels of first display data, wherein the second M channels of first display data are located in the right area of the display screen.
wherein before fusing the first display data with the second display data according to the target display position, the method further comprises:
acquiring a row synchronization signal of the display screen; and
calculating the number of current data rows according to the row synchronization signal.
wherein fusing the first display data with the second display data according to the target display position data and the number of current data rows comprises:
when it is determined that the target display position data is located in the upper area of the display screen and the number of current data rows is less than or equal to a first preset threshold, outputting the second display data to obtain the third display data; and
when it is determined that the target display data is located in the upper area of the display screen and the number of current data rows is greater than the first preset threshold, the first display data is output to obtain the third display data.
wherein fusing the first display data with the second display data according to the target display position and the number of current data rows comprises:
when it is determined that the target display position data is located in the lower area of the display screen and the number of current data rows is less than or equal to a second preset threshold, outputting the first display data to obtain the third display data; and
when it is determined that the target display position data is located in the lower area of the display screen and the number of current data rows is greater than the second preset threshold, the second display data is output to obtain the third display data.
A displaying device, comprising:
an acquisition module configured to acquire menu data, target display position data of the menu data on a display screen, and source data, wherein the source data includes N channels of first display data, the first display data has a preset size, and N is an integer greater than 2;
a conversion module configured to conduct format conversion on the menu data to obtain M channels of second display data with a preset size, wherein M is an integer greater than or equal to 1 and less than or equal to N;
a fusion module configured to fuse the first display data with the second display data according to the target display position data to obtain third display data; and
a display module configured to display the third display data on the display screen.

Electronic equipment, comprising:
a processor; and
a memory for storing processor executable instructions;
wherein the processor is configured to execute the instructions to implement the display method, comprising:
acquiring menu data, target display position data of the menu data on a display screen, and source data, wherein the source data includes N channels of first display data, the first display data has a preset size, and N is an integer greater than 2;
conducting format conversion on the menu data to obtain M channels of second display data with a preset size, wherein M is an integer greater than or equal to 1 and less than or equal to N;
fusing the first display data with the second display data according to the target display position data to obtain third display data; and
displaying the third display data on the display screen.

A non-transitory computer-readable storage medium, wherein when instructions in the storage medium are executed by a processor of electronic equipment, the electronic equipment executes the display method, comprising:
acquiring menu data, target display position data of the menu data on a display screen, and source data, wherein the source data includes N channels of first display data, the first display data has a preset size, and N is an integer greater than 2;
conducting format conversion on the menu data to obtain M channels of second display data with a preset size, wherein M is an integer greater than or equal to 1 and less than or equal to N;
fusing the first display data with the second display data according to the target display position data to obtain third display data; and
displaying the third display data on the display screen.
wherein conducting format conversion on the menu data comprises:
storing the menu data in a storage unit according to the target display position data; and
reading the menu data from the storage unit according to the preset size to obtain the second display data.
wherein storing the menu data in a storage unit according to the target display position data comprises:
when it is determined that the target display position data is located in an upper area of the display screen, storing the menu data from a first address of the storage unit, wherein the first address is an initial address of the storage unit; and
when it is determined that the target display position data is located in a lower area of the display screen, storing the menu data from a second address of the storage unit, wherein the second address is determined according to an initial size and preset size of the menu data.
wherein fusing the first display data with the second display data according to the target display position comprises:
when it is determined that the target display position data is located in a left area of the display screen, fusing the M channels of second display data with the first M channels of first display data among the N channels of first display data, wherein the first M channels of first display data is located in the left area of the display screen; and
when it is determined that the target display position data is located in a right area of the display screen, fusing the M channels of second display data with the second M channels of first display data among the N channels of first display data, wherein the second M channels of first display data are located in the right area of the display screen.
wherein before fusing the first display data with the second display data according to the target display position, the method further comprises:
acquiring a row synchronization signal of the display screen; and
calculating the number of current data rows according to the row synchronization signal.
wherein fusing the first display data with the second display data according to the target display position data and the number of current data rows comprises:
when it is determined that the target display position data is located in the upper area of the display screen and the number of current data rows is less than or equal to a first preset threshold, outputting the second display data to obtain the third display data; and
when it is determined that the target display data is located in the upper area of the display screen and the number of current data rows is greater than the first preset threshold, the first display data is output to obtain the third display data.
wherein fusing the first display data with the second display data according to the target display position and the number of current data rows comprises:
when it is determined that the target display position data is located in the lower area of the display screen and the number of current data rows is less than or equal to a second preset threshold, outputting the first display data to obtain the third display data; and
when it is determined that the target display position data is located in the lower area of the display screen and the number of current data rows is greater than the second preset threshold, the second display data is output to obtain the third display data.
wherein conducting format conversion on the menu data comprises:
storing the menu data in a storage unit according to the target display position data; and
reading the menu data from the storage unit according to the preset size to obtain the second display data.
wherein storing the menu data in a storage unit according to the target display position data comprises:
when it is determined that the target display position data is located in an upper area of the display screen, storing the menu data from a first address of the storage unit, wherein the first address is an initial address of the storage unit; and
when it is determined that the target display position data is located in a lower area of the display screen, storing the menu data from a second address of the storage unit, wherein the second address is determined according to an initial size and preset size of the menu data.
wherein fusing the first display data with the second display data according to the target display position comprises:
when it is determined that the target display position data is located in a left area of the display screen, fusing the M channels of second display data with the first M channels of first display data among the N channels of first display data, wherein the first M channels of first display data is located in the left area of the display screen; and
when it is determined that the target display position data is located in a right area of the display screen, fusing the M channels of second display data with the second M channels of first display data among the N channels of first display data, wherein the second M channels of first display data are located in the right area of the display screen.

wherein before fusing the first display data with the second display data according to the target display position, the method further comprises:

acquiring a row synchronization signal of the display screen; and calculating the number of current data rows according to the row synchronization signal.

wherein fusing the first display data with the second display data according to the target display position and the number of current data rows comprises:

when it is determined that the target display position data is located in the lower area of the display screen and the number of current data rows is less than or equal to a second preset threshold, outputting the first display data to obtain the third display data; and when it is determined that the target display position data is located in the lower area of the display screen and the number of current data rows is greater than the second preset threshold, the second display data is output to obtain the third display data.

According to the technical solutions of the embodiments of the disclosure, an operator can set the target display position data of the menu data on a display screen, fuse format-converted menu data with the source data according to the target display position data, and then display third display data obtained by fusion on the display screen, thereby adjusting a display position of an OSD menu. Therefore, operators who have different heights and are at different positions can easily control the OSD menu, which is beneficial to channel selection or display parameter setting of large-size displays.

BRIEF DESCRIPTION OF THE DRAWINGS

In order to explain the technical solutions of the embodiments of the disclosure more clearly, the drawings used in the description of the embodiments of the disclosure will be briefly introduced below. Obviously, the drawings in the following description are only some embodiments of the disclosure. For those skilled in the art, other drawings can be obtained according to these drawings without creative labor.

DETAILED DESCRIPTION

In order to make the above objects, features, and advantages of the embodiments of the disclosure better understood, the embodiments of the disclosure will be described in further detail below with reference to the accompanying drawings and detailed description.

Figure 1:
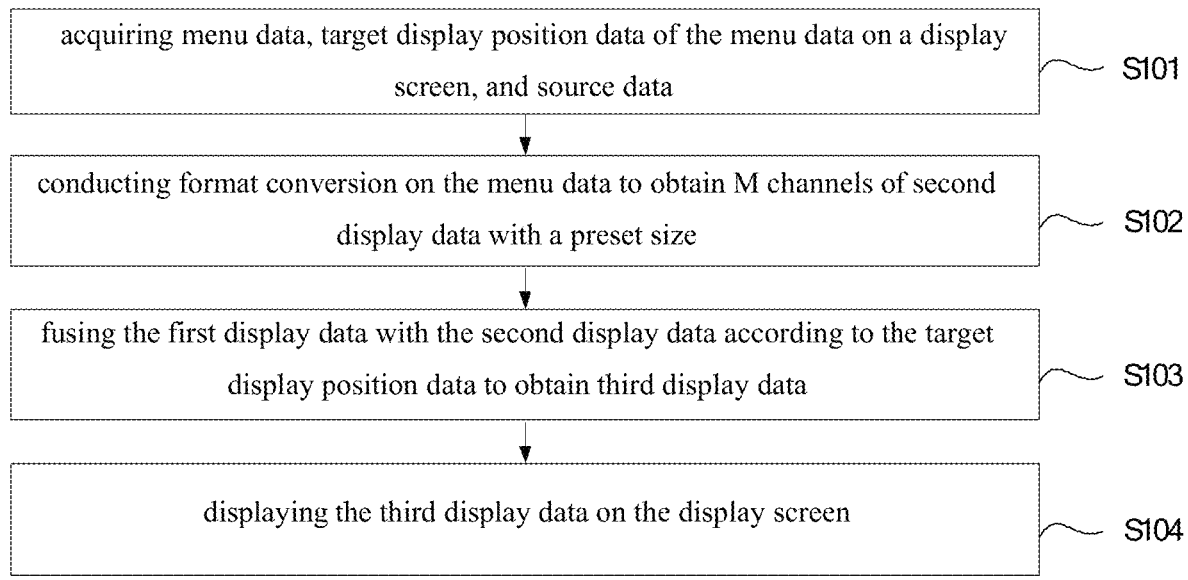
FIG. 1 shows a schematic flowchart of a display method according to an embodiment of the disclosure.

An embodiment of the disclosure provides a display method. As shown in FIG. 1, the display method may comprise the following steps.

Step S101, acquiring menu data, target display position data of the menu data on a display screen, and source data, wherein the source data includes N channels of first display data, and the first display data has a preset size.

Figure 8:
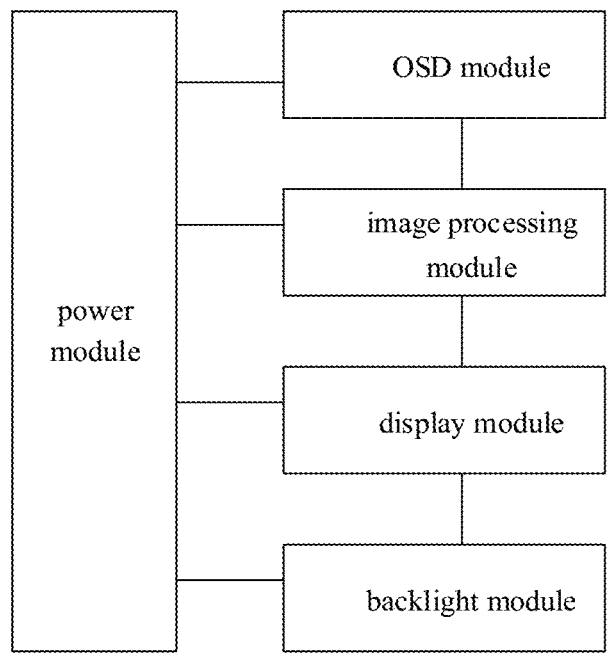
FIG. 8 shows a hardware structure block diagram of displaying equipment according to an embodiment of the disclosure.

An executive body of the embodiment may be displaying equipment, or a functional module and/or a functional entity (such as image processing module) in the displaying equipment which can realize the display method provided by the embodiment. Referring to FIG. 8 which shows a hardware structure block diagram of displaying equipment, and the displaying equipment comprises a power module, a backlight module, a display module, an OSD module and an image processing module, wherein the power module is configured to supply power to all the modules in the displaying equipment, the backlight module (such as a backlight module set) is configured to provide a light source for the displaying equipment, the display module (such as a display screen) is configured to display the information finally visible to a user, the OSD module (such as a hardware card) is configured to draw and output the menu data (OSD information) to the image processing module, and the image processing module (such as a hardware card) is configured to execute the display method provided in the embodiment, that is, fuse the menu data with the source data (external signal source) according to the target display position set by the user to finally switch an OSD position. In the embodiment, a large-size 8K display system is illustrated as the displaying equipment as an example.

Figure 7:
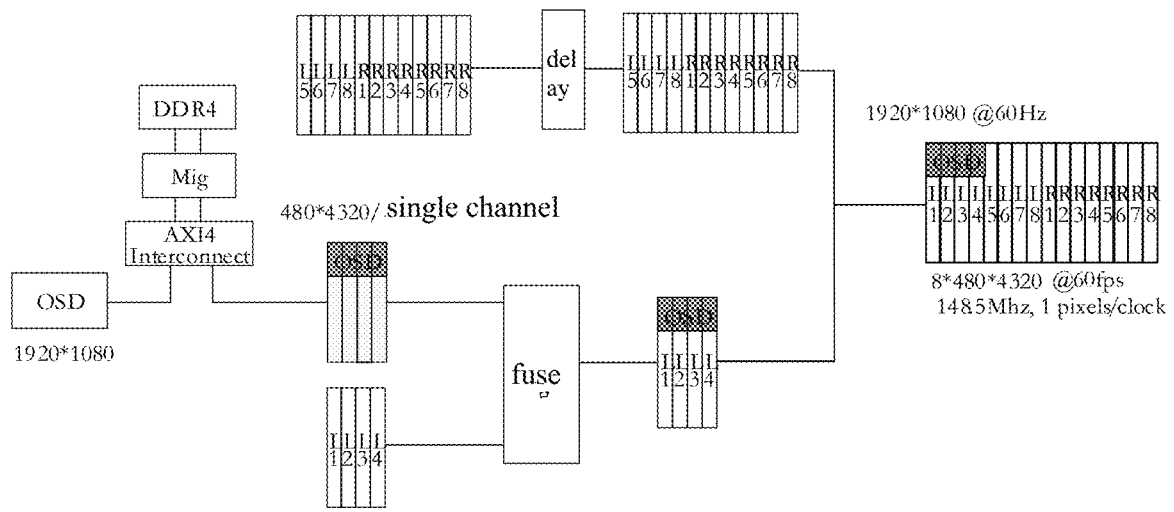
FIG. 7 is a flow diagram showing that an OSD menu is displayed at the upper left corner of a screen according to an embodiment of the disclosure.

Referring to FIG. 7, the menu data (OSD information) can be input from the OSD module to the image processing module. The initial size of the menu data is 960*1080, and 2 pixels are sampled per clock, that is, the total number of pixels acquired per frame is 1920*1080.

The source data (external source information) is input from an external port of the image processing module, and is converted into 16 channels of first display data with a preset size of 480*4320 after a series of front-end processing. The 16 channels of first display data is L1, L2, . . . L8, R1, R2, . . . R8 sequentially from left to right, and one pixel is sampled per clock.

Figure 5:
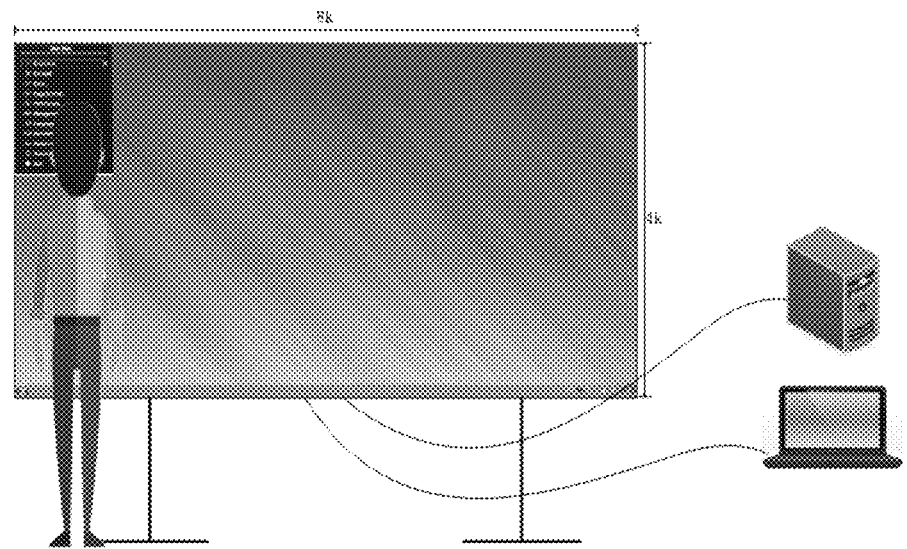
FIG. 5 shows a schematic diagram of a user operating a large-size display according to an embodiment of the disclosure.
Figure 6:
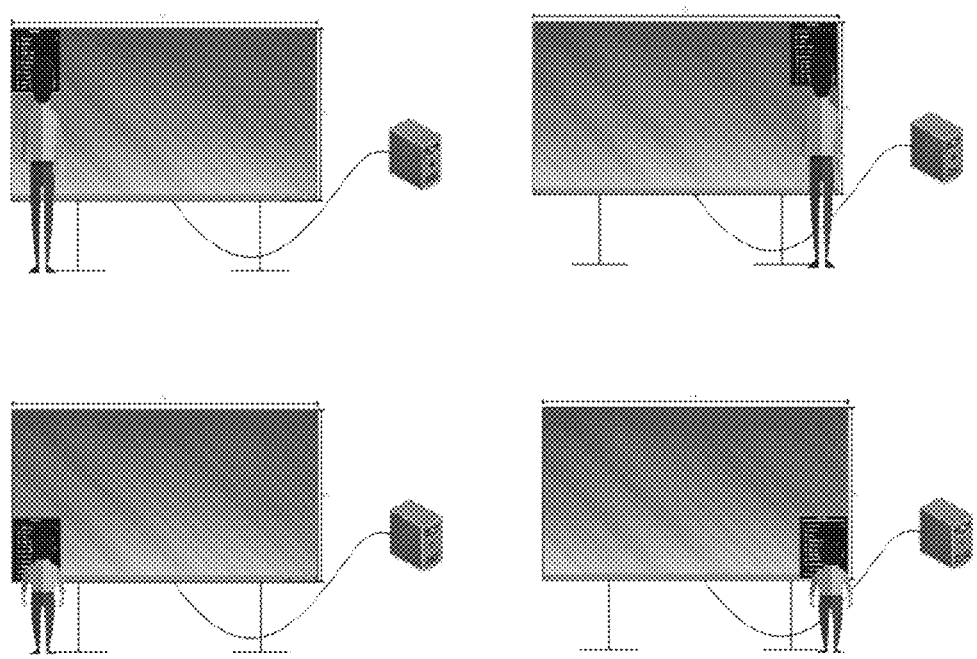
FIG. 6 is a schematic diagram showing that four OSD menus are displayed at different target display positions on a screen according to an embodiment of the disclosure.

Referring to FIG. 5, a schematic diagram of the operation of a large-size display is shown. In the figure, the user sets the target display position of the OSD menu at the upper left corner of the screen. In practical application, the user can set the target display position of the OSD menu at the upper left, lower left, upper right and lower right parts of the screen as needed, as shown in FIG. 6.

Step S102, conducting format conversion on the menu data to obtain second display data with a preset size.

In order to realize the fusion of the menu data and the source data, it is necessary to conduct format conversion on the menu data to make the menu data have the same preset size as the first display data.

For example, the menu data can be stored in a storage unit, and a single channel of menu data with a size of 960*1080 can be converted into four channels of second display data with a size of 480*4320 (preset size).

Step S103, fusing the first display data with the second display data according to the target display position data to obtain third display data.

In the embodiment, the target display position may be the upper left part (left and upper areas), lower left part (left and lower areas), upper right part (right and upper areas), lower right part (right and lower area) and other areas. The purpose of fusing the first display data with the second display data in the embodiment is to determine whether the display data of each pixel on the screen is the first display data or the second display data. The third display data obtained after fusion still includes 16 channels of signals.

Assuming that a pixel area of the display screen includes 1~n rows of scanning lines and 1~m columns of data lines, it can be defined that the first row to the (n/2)<th> (rounded) row constitutes the upper area, the next row of the (n/2)<th> (rounded) row to the n<th> row constitutes the lower area, the first column to the (m/2)<th> (rounded) column constitutes the left area, and the next column of the (m/2)<th> (rounded) column to the m<th> column constitutes the right area.

Step S104, displaying the third display data on the display screen.

In specific implementation, the 16 channels of signals in the third display data can be synchronized by a delay unit in the image processing module and output to the display screen, so that the OSD menu can be displayed at the target display position on the display screen.

In the display method provided in the embodiment, an operator can set the target display position of the menu data on the display screen, fuse the format-converted menu data with the source data according to the target display position, and then display the third display data obtained by fusion on the display screen, thereby adjusting the display position of the OSD menu. Therefore, operators who have different heights and are at different positions can easily control the OSD menu, which is beneficial to channel selection or display parameter setting of large-size displays.

Figure 2:
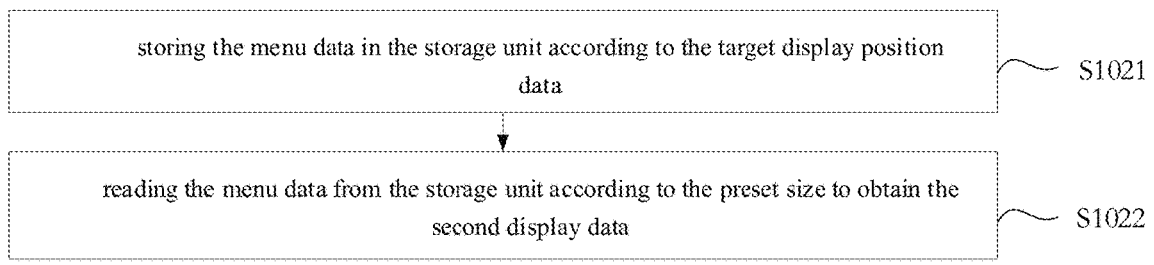
FIG. 2 shows a schematic flowchart of the format conversion of menu data according to an embodiment of the disclosure.

For example, referring to FIG. 2, step S102 may further comprise the following steps.

Step 1021, storing the menu data in the storage unit according to the target display position data.

Specifically, when the target display position is located in the upper area of the display screen, the menu data is stored from a first address of the storage unit, and the first address is an initial address (0 address) of the storage unit. When the target display position is located in the lower area of the display screen, the menu data is stored from a second address of the storage unit, and the second address is determined according to an initial size and preset size of the menu data.

The storage unit can be, for example, a ddr4 double rate synchronous dynamic random access memory.

The way of storing the menu data in the storage unit (e.g., ddr4 with a storage capacity of 4 Gb, where Row=15, Column=10, Bank=2, Bank Group=1) can be determined by the target display position set by the user. For example, assuming that a reading size of the second display data is 480*4320, when the target display position is located in the upper area of the display screen, the menu data can be stored from the 0 address of the storage unit from top to bottom and from left to right. When the target display position is located in the lower area of the display screen, the menu data can be stored from the second address 960*3240=25'd3110400 of the storage unit from top to bottom and from left to right, address information is incremented one by one, and each address stores two pixels of data until the menu data (1920*1080 pixels) is completely stored. The second address can be determined according to the initial size 960*1080 and the preset size 480*4320 of the menu data.

Step S1022, reading the menu data from the storage unit according to the preset size to obtain the second display data.

For example, it is assumed that the menu data is stored in the storage unit with a single-channel initial size of 960*1080, and read from the storage unit (e.g., ddr4) according to the preset size of 480*4320, and four channels of second display data with a size of 480*4320 are obtained.

Figure 3:
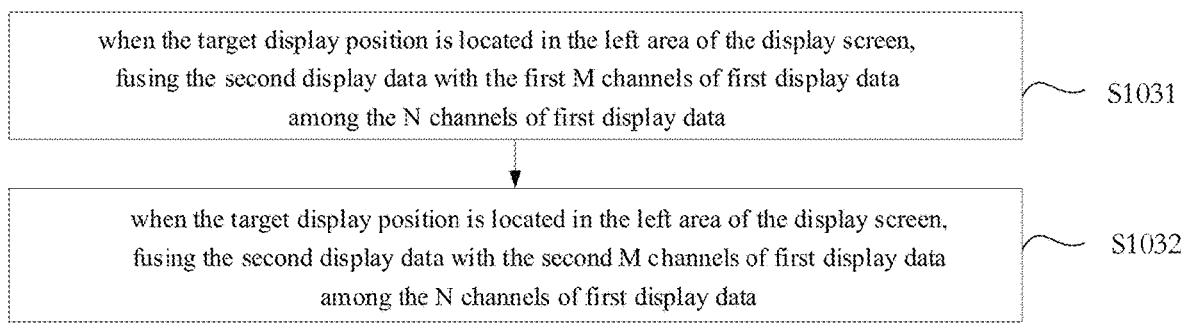
FIG. 3 shows a schematic flowchart for fusing first display data and second display data according to an embodiment of the disclosure.

For example, referring to FIG. 3, step S103 may further comprise the following steps.

Step S1031, when the target display position is located in the left area of the display screen, fusing the second display data with the first M channels of first display data among the N channels of first display data, wherein the first M channels of first display data are located in the left area of the display screen.

Step S1032, when the target display position is located in the right area of the display screen, fusing the second display data with the second M channels of first display data among the N channels of first display data, wherein the second M channels of first display data are located in the right area of the display screen.

In practical application, four (M=4) channels of second display data with a size of 480*4320 are output from the storage unit, and the initial reading addresses of the four channels of second display data in the storage unit are 0, 240, 480 and 720, respectively. It should be noted that the initial reading position of each channel of second display data from the storage unit is related to the size of each channel and the target display position. The initial reading position given herein corresponds to the situation that the OSD menu is located at the upper left corner of the screen.

The setting of the target display position by the user determines which channels of first display data will be fused with the four channels of second display data. Specifically, when the target display position is located in the left area of the display screen, the four channels of second display data will be fused with the L1, L2, L3 and L4 (the left four channels) of first display data. When the target display position is located in the right area of the display screen, the four channels of second display data will be fused with the R5, R6, R7 and R8 (the right four channels) of first display data.

Figure 4:
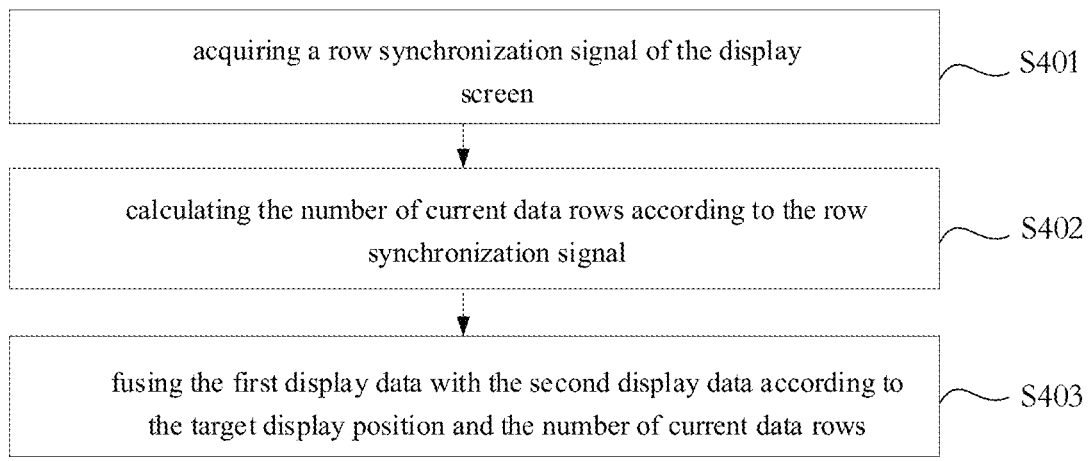
FIG. 4 shows another flowchart for fusing first display data and second display data according to an embodiment of the disclosure.

Referring to FIG. 4, the following steps may be further included before step S103.

Step S401, acquiring a row synchronization signal of the display screen.

Step S402, calculating the number of current data rows according to the row synchronization signal.

Accordingly, step S103 may further comprise:

Step S403, fusing the first display data with the second display data according to the target display position and the number of current data rows.

For example, when the target display position is the upper area of the display screen and the number of current data rows is less than or equal to a first preset threshold, the second display data is output to obtain the third display data.

When the target display position is the upper area of the display screen and the number of current data rows is greater than the first preset threshold, the first display data is output to obtain the third display data.

When the target display position is the lower area of the display screen and the number of current data rows is less than or equal to a second preset threshold, the first display data is output to obtain the third display data. When the target display position is the lower area of the display screen and the number of current data rows is greater than the second preset threshold, the second display data is output to obtain the third display data.

The four channels of second display data with a size of 480*4320 read from the storage unit can be fused with the first display data by a fusion unit.

For example, the number of current data rows 1_count can be counted by the row synchronization signal (because the reading size is 480*4320, the range of 1_count is 14320).

For example, when the target display position is the upper area of the display screen, if 1_count<=1080 (the first preset threshold), the second display data is output, and if 1_count>1080 (the first preset threshold), the first display data is output. When the target display position is the lower area of the display screen, if 1_count<=3240 (the second preset threshold), the first display data is output, and if 1_count>3240 (the second preset threshold), the second display data is output.

Further, when the target display position is the upper left corner of the display screen, if 1_count<=1080, the second display data is output for L1, L2, L3 and L4. When the target display position is the upper right corner of the display screen, if 1_count<=1080, the second display data is output for R5, R6, R7 and R8. When the target display position is the lower left corner of the display screen, if 1_count>3240, the second display data is output for L1, L2, L3 and L4. When the target display position is the lower right corner of the display screen, if 1_count>3240, the second display data is output for R5, R6, R7 and R8.

The first preset threshold and the second preset threshold can be determined according to the initial size 1920*1080 and the preset size 480*4320 of the menu data. For example, the first preset threshold may be the number of rows in the initial size (such as 1080), and the second preset threshold may be the difference between the number of rows in the preset size and the number of rows in the initial size (such as 4320−1080=3240).

Figure 9:
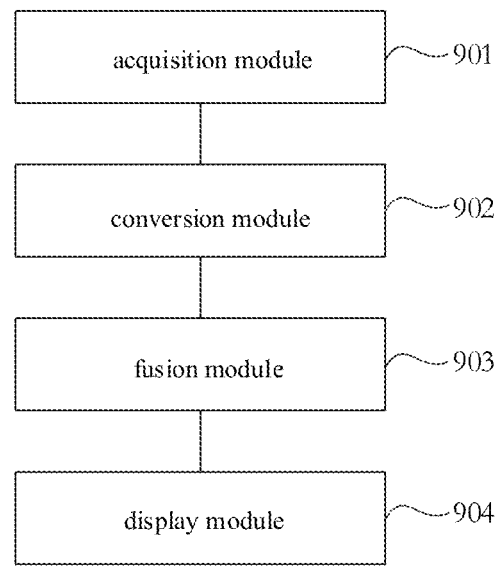
FIG. 9 shows a structural block diagram of a displaying device according to an embodiment of the disclosure.

Another embodiment of the disclosure provides a displaying device. Referring to FIG. 9, the displaying device may comprise the following modules:

an acquisition module 901 configured to acquire menu data, a target display position of the menu data on a display screen, and source data, wherein the source data includes a plurality of channels of first display data, and the first display data has a preset size; a conversion module 902 configured to perform format conversion on the menu data to obtain second display data with a preset size; a fusion module 903 configured to fuse the first display data with the second display data according to the target display position to obtain third display data; and a display module 904 configured to display the third display data on the display screen.

For the device in the above embodiments, the specific operating manner of each module has been described in detail in the method embodiments, and will not be described in detail here.

Figure 10:
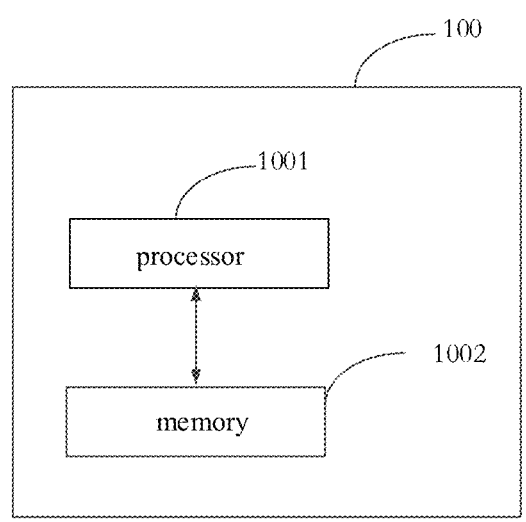
FIG. 10 shows a structural block diagram of a displaying device according to an embodiment of the disclosure.

Another embodiment of the disclosure provides electronic equipment. As shown in FIG. 10, the electronic equipment 100 may comprise a processor 1001; and a memory 1002 for storing instructions executable by the processor. The processor 1001 is configured to execute the instructions to realize the display method according to any embodiment.

An embodiment of the disclosure provides a non-transient storage medium. When instructions in the non-transient storage medium are executed by the processor of the electronic equipment, the electronic equipment can execute the display method according to any embodiment.

The embodiments of the disclosure provide a display method, a displaying device, electronic equipment, and a storage medium. The display method comprises: acquiring menu data, a target display position of the menu data on a display screen, and source data, wherein the source data includes N channels of first display data, and the first display data has a preset size; conducting format conversion on the menu data to obtain M channels of second display data with a preset size; fusing the first display data with the second display data according to the target display position to obtain third display data; and displaying the third display data on the display screen. In the technical solution of the embodiments of the disclosure, the target display position of the menu data on the display screen can be set by the operator, the format-converted menu data and the source data is fused according to the target display position, and then the third display data obtained by fusion is displayed on the display screen, thereby adjusting the display position of the OSD menu. Therefore, operators who have different heights and are at different positions can easily control the OSD menu, which is beneficial to channel selection or display parameter setting of large-size displays.

All the embodiments in this specification are described in a progressive way, and each embodiment focuses on the differences from other embodiments. The same and similar parts among the embodiments are referable to one another.

It should be also noted that herein, relational terms such as first and second are only used to distinguish one entity or operation from another entity or operation, and do not necessarily require or imply any such actual relationship or order between these entities or operations. The terms "comprise", "include", or any other variations thereof, are intended to cover a non-exclusive inclusion, such that a process, method, article, or device which includes a list of elements does not include only those elements but also other elements not expressly listed or inherent to such process, method, article, or device. Without further limitation, an element defined by the statement "includes a . . . " does not exclude the presence of another identical element in a process, method, article or device that includes the element.

The display method, the displaying device, the electronic equipment, and the non-transient storage medium provided by the embodiments of the disclosure are described in detail above. Specific examples are applied herein to illustrate the principle and implementation of the embodiments of the disclosure. The above embodiments are only used to help understand the method of the embodiments of the disclosure and its core ideas. For those of ordinary skill in the art, according to the idea of the embodiments of the disclosure, there will be some changes in the specific implementation and application scope. To sum up, the contents of this specification should not be understood as a limitation of the embodiments of the disclosure.

The invention claimed is:

1. A display method, comprising:
acquiring menu data with an initial size, target display position data of the menu data on a display screen, and source data, wherein the source data includes N channels of first display data, the first display data has a preset size, and N is an integer greater than 2;

conducting format conversion on the menu data with the initial size to obtain M channels of second display data with the preset size, wherein M is an integer greater than or equal to 1 and less than or equal to N;

fusing the first display data with the second display data according to the target display position data to obtain third display data; and displaying the third display data on the display screen, wherein before fusing the first display data with the second display data according to the target display position, the method further comprises:

acquiring a row synchronization signal of the display screen; and calculating the number of current data rows according to the row synchronization signal; and wherein fusing the first display data with the second display data according to the target display position data and the number of current data rows comprises:

when it is determined that the target display position data is located in the upper area of the display screen and the number of current data rows is less than or equal to a first preset threshold, outputting the second display data to obtain the third display data;

when it is determined that the target display data is located in the upper area of the display screen and the number of current data rows is greater than the first preset threshold, the first display data is output to obtain the third display data;

when it is determined that the target display position data is located in the lower area of the display screen and the number of current data rows is less than or equal to a second preset threshold, outputting the first display data to obtain the third display data; and when it is determined that the target display position data is located in the lower area of the display screen and the number of current data rows is greater than the second preset threshold, the second display data is output to obtain the third display data.

2. The display method according to claim 1, wherein conducting format conversion on the menu data with the initial size comprises:

storing the menu data with the initial size in a storage unit according to the target display position data; and reading the menu data from the storage unit according to the preset size to obtain the second display data.

3. The display method according to claim 2, wherein storing the menu data with the initial size in the storage unit according to the target display position comprises:

when it is determined that the target display position data is located in an upper area of the display screen, storing the menu data with the initial size from a first address of the storage unit, wherein the first address is an initial address of the storage unit; and when it is determined that the target display position data is located in a lower area of the display screen, storing the menu data with the initial size from a second address of the storage unit, wherein the second address is determined according to the initial size and preset size of the menu data.

4. The display method according to claim 1, wherein fusing the first display data with the second display data according to the target display position comprises:

when it is determined that the target display position data is located in a left area of the display screen, fusing the M channels of second display data with first M channels of first display data among the N channels of first display data, wherein the first M channels of first display data is located in the left area of the display screen; and when it is determined that the target display position data is located in a right area of the display screen, fusing the M channels of second display data with second M channels of first display data among the N channels of first display data, wherein the second M channels of first display data are located in the right area of the display screen.

5. An electronic equipment, comprising:

a processor; and a memory for storing processor executable instructions;

wherein the processor is configured to execute the instructions to implement the display method, comprising:

acquiring menu data with an initial size, target display position data of the menu data on a display screen, and source data, wherein the source data includes N channels of first display data, the first display data has a preset size, and N is an integer greater than 2;

conducting format conversion on the menu data with an initial size to obtain M channels of second display data with the preset size, wherein M is an integer greater than or equal to 1 and less than or equal to N;

fusing the first display data with the second display data according to the target display position data to obtain third display data; and displaying the third display data on the display screen, wherein before fusing the first display data with the second display data according to the target display position, the method further comprises:

acquiring a row synchronization signal of the display screen; and calculating the number of current data rows according to the row synchronization signal; and wherein fusing the first display data with the second display data according to the target display position data and the number of current data rows comprises:

when it is determined that the target display position data is located in the upper area of the display screen and the number of current data rows is less than or equal to a first preset threshold, outputting the second display data to obtain the third display data;

when it is determined that the target display data is located in the upper area of the display screen and the number of current data rows is greater than the first preset threshold, the first display data is output to obtain the third display data;

when it is determined that the target display position data is located in the lower area of the display screen and the number of current data rows is less than or equal to a second preset threshold, outputting the first display data to obtain the third display data; and when it is determined that the target display position data is located in the lower area of the display screen and the number of current data rows is greater than the second preset threshold, the second display data is output to obtain the third display data.

6. The electronic equipment according to claim 5, wherein conducting format conversion with the initial size on the menu data comprises:

storing the menu data with the initial size in a storage unit according to the target display position data; and reading the menu data from the storage unit according to the preset size to obtain the second display data.

7. The electronic equipment according to claim 6, wherein storing the menu data with the initial size in a storage unit according to the target display position data comprises:
- when it is determined that the target display position data is located in an upper area of the display screen, storing the menu data with the initial size from a first address of the storage unit, wherein the first address is an initial address of the storage unit; and
- when it is determined that the target display position data is located in a lower area of the display screen, storing the menu data with the initial size from a second address of the storage unit, wherein the second address is determined according to the initial size and preset size of the menu data.

8. The electronic equipment according to claim 5, wherein fusing the first display data with the second display data according to the target display position comprises:
- when it is determined that the target display position data is located in a left area of the display screen, fusing the M channels of second display data with first M channels of first display data among the N channels of first display data, wherein the first M channels of first display data is located in the left area of the display screen; and
- when it is determined that the target display position data is located in a right area of the display screen, fusing the M channels of second display data with second M channels of first display data among the N channels of first display data, wherein the second M channels of first display data are located in the right area of the display screen.

9. A non-transitory computer-readable storage medium, wherein when instructions in the storage medium are executed by a processor of electronic equipment, the electronic equipment executes the display method comprising:
- acquiring menu data with an initial size, target display position data of the menu data on a display screen, and source data, wherein the source data includes N channels of first display data, the first display data has a preset size, and N is an integer greater than 2;
- conducting format conversion on the menu data with an initial size to obtain M channels of second display data with the preset size, wherein M is an integer greater than or equal to 1 and less than or equal to N;
- fusing the first display data with the second display data according to the target display position data to obtain third display data; and
- displaying the third display data on the display screen,
- wherein before fusing the first display data with the second display data according to the target display position, the method further comprises:
  - acquiring a row synchronization signal of the display screen; and
  - calculating the number of current data rows according to the row synchronization signal; and
- wherein fusing the first display data with the second display data according to the target display position data and the number of current data rows comprises:
  - when it is determined that the target display position data is located in the upper area of the display screen and the number of current data rows is less than or equal to a first preset threshold, outputting the second display data to obtain the third display data;
  - when it is determined that the target display data is located in the upper area of the display screen and the number of current data rows is greater than the first preset threshold, the first display data is output to obtain the third display data;
  - when it is determined that the target display position data is located in the lower area of the display screen and the number of current data rows is less than or equal to a second preset threshold, outputting the first display data to obtain the third display data; and
  - when it is determined that the target display position data is located in the lower area of the display screen and the number of current data rows is greater than the second preset threshold, the second display data is output to obtain the third display data.

10. The non-transitory computer-readable storage medium according to claim 9, wherein conducting format conversion on the menu data with the initial size comprises:
- storing the menu data with the initial size in a storage unit according to the target display position data; and
- reading the menu data from the storage unit according to the preset size to obtain the second display data.

11. The non-transitory computer-readable storage medium according to claim 10, wherein storing the menu data with the initial size in a storage unit according to the target display position data comprises:
- when it is determined that the target display position data is located in an upper area of the display screen, storing the menu data with the initial size from a first address of the storage unit, wherein the first address is an initial address of the storage unit; and
- when it is determined that the target display position data is located in a lower area of the display screen, storing the menu data with the initial size from a second address of the storage unit, wherein the second address is determined according to the initial size and preset size of the menu data.

12. The non-transitory computer-readable storage medium according to claim 9, wherein fusing the first display data with the second display data according to the target display position comprises:
- when it is determined that the target display position data is located in a left area of the display screen, fusing the M channels of second display data with first M channels of first display data among the N channels of first display data, wherein the first M channels of first display data is located in the left area of the display screen; and
- when it is determined that the target display position data is located in a right area of the display screen, fusing the M channels of second display data with second M channels of first display data among the N channels of first display data, wherein the second M channels of first display data are located in the right area of the display screen.

* * * * *